(12) United States Patent
Griffin et al.

(10) Patent No.: US 9,417,695 B2
(45) Date of Patent: Aug. 16, 2016

(54) TACTILE FEEDBACK METHOD AND APPARATUS

(75) Inventors: Jason Tyler Griffin, Kitchener (CA); Perry Allan Faubert, Surrey (CA)

(73) Assignee: BlackBerry Limited, Waterloo (CA)

( * ) Notice: Subject to any disclaimer, the term of this patent is extended or adjusted under 35 U.S.C. 154(b) by 1563 days.

(21) Appl. No.: 12/756,761

(22) Filed: Apr. 8, 2010

(65) Prior Publication Data

US 2011/0248916 A1    Oct. 13, 2011

(51) Int. Cl.
  *G06F 3/041*   (2006.01)
  *G06F 3/01*    (2006.01)
  *G06F 3/0488*  (2013.01)

(52) U.S. Cl.
  CPC .............. *G06F 3/016* (2013.01); *G06F 3/0488* (2013.01); *G06F 2203/014* (2013.01)

(58) Field of Classification Search
  USPC ......................................................... 345/173
  See application file for complete search history.

(56) References Cited

U.S. PATENT DOCUMENTS

| 6,429,846 B2 | 8/2002 | Rosenberg et al. |
| 2007/0236450 A1 | 10/2007 | Colgate et al. |
| 2008/0238886 A1 | 10/2008 | Bengtsson et al. |
| 2009/0113330 A1* | 4/2009 | Garrison et al. ............... 715/769 |
| 2009/0167701 A1 | 7/2009 | Ronkainen |
| 2009/0219252 A1* | 9/2009 | Jarventie et al. ............... 345/173 |
| 2009/0262091 A1 | 10/2009 | Ikeda et al. |

FOREIGN PATENT DOCUMENTS

WO    2008/037275 A1    4/2008

OTHER PUBLICATIONS

Dunlop M D et al.:"Tactile feedback for predictive text entry", Internet Citation, Apr. 4, 2009, pp. 2257-2260, XP002578182.
Extended European Search Report dated Sep. 28, 2010, issued from the corresponding European patent application.
Examiner's Report dated Oct. 24, 2013, issued in respect of corresponding Canadian Patent Application No. 2,734,916.
Examiner's Report dated Feb. 6, 2013, issued in corresponding Canadian Patent Application No. 2,734,916.

* cited by examiner

*Primary Examiner* — Kathy Wang-Hurst
*Assistant Examiner* — Jose Soto Lopez
(74) *Attorney, Agent, or Firm* — Borden Ladner Gervais LLP; Geoffrey deKleine (57) ABSTRACT

A method includes displaying on a display at least one selection option comprising a first selection option and detecting a touch or cursor on the display. Tactile feedback having a first characteristic is provided when the touch or cursor is at a first location associated with the first selection option. Tactile feedback having a second characteristic is provided when the touch or cursor is detected at a second location not associated with the first selection option.

19 Claims, 5 Drawing Sheets

TACTILE FEEDBACK METHOD AND APPARATUS

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

The following describes an apparatus for and method of providing tactile feedback to vary the resistance to movement of a touch along a touch-sensitive display or other touch-sensitive device, e.g., varying the friction effect. The tactile feedback may be applied to guide a touch toward an identified selection option. One or more piezoelectric actuators may be utilized to provide tactile feedback to the touch-sensitive display, for example, in response to an actuation signal.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

Figure 1:
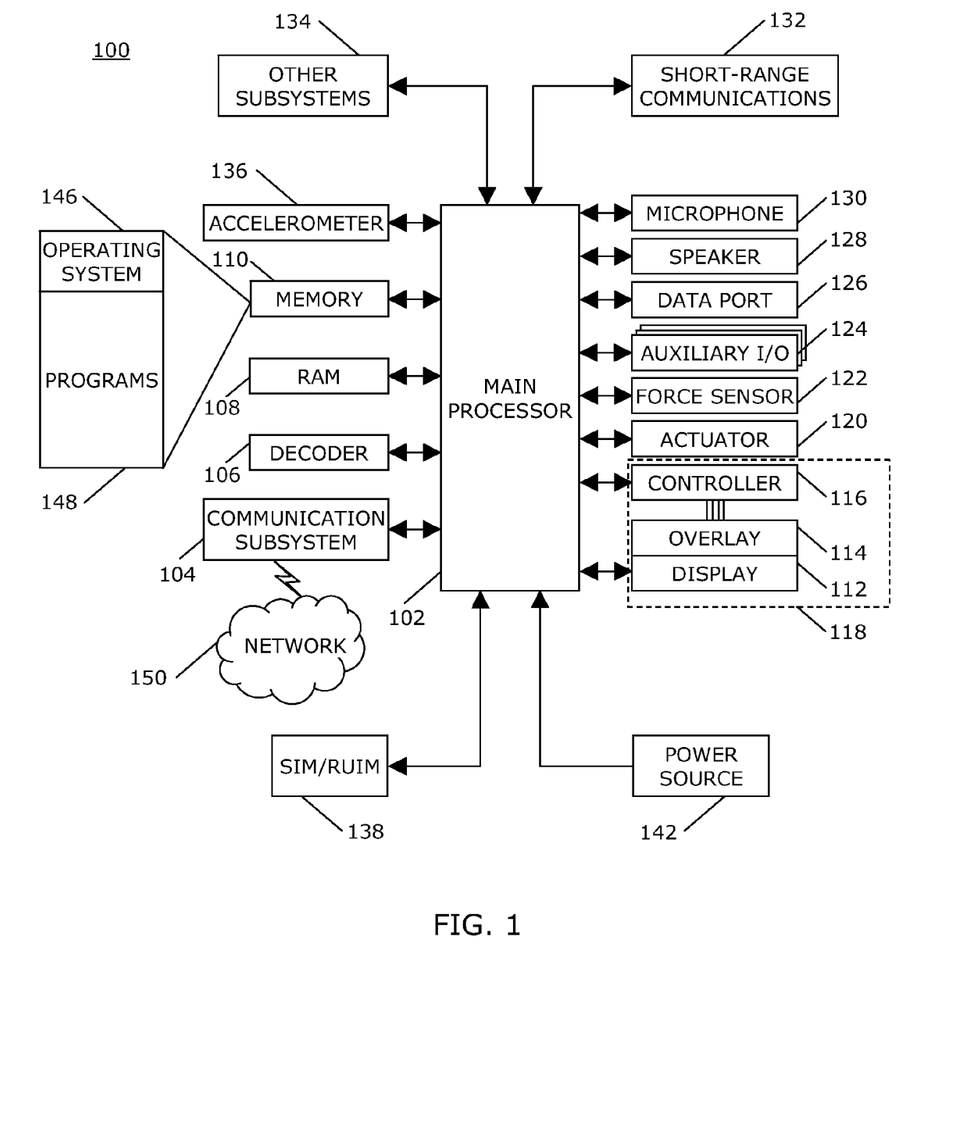
FIG. 1 is a block diagram of a portable electronic device in accordance with the disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback. Other different types of actuators 120 may be utilized than those described herein. When force is applied, the touch-sensitive display 118 is depressible, pivotable, and/or movable. Tactile, or haptic, feedback may be provided by apparatus such as one or more actuators 120, such as piezoelectric devices, vibrator motors also known as vibramotors, ultrasonic devices, or other suitable apparatus.

Figure 2:
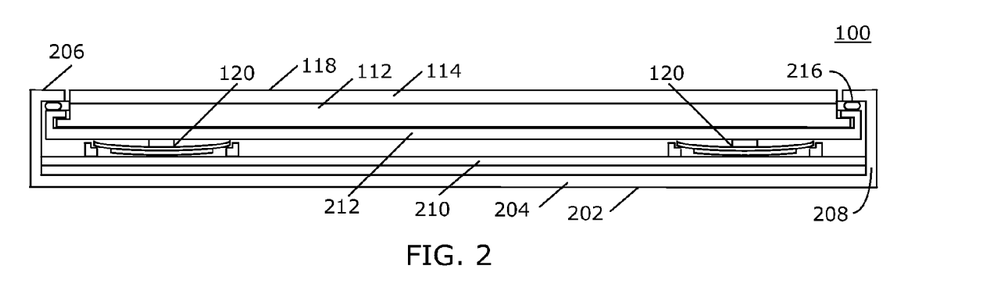
FIG. 2 is a sectional side view of a portable electronic device with piezoelectric actuators in accordance with the disclosure.

A cross section of a portable electronic device 100 taken through the centers of piezoelectric ("piezo") actuators 120 is shown in FIG. 2. The portable electronic device 100 includes a housing 202 that encloses components such as shown in FIG. 1. The housing 202 may include a back 204, sidewalls 208, and a frame 206 that houses the touch-sensitive display 118. A base 210 extends between the sidewalls 208, generally parallel to the back 204, and supports the actuators 120. The display 112 and the overlay 114 are supported on a support tray 212 of suitable material, such as magnesium. Optional spacers 216 may be located between the support tray 212 and the frame 206, may advantageously be flexible, and may also be compliant or compressible, and may comprise gel pads, spring elements such as leaf springs, foam, and so forth.

Figure 3:
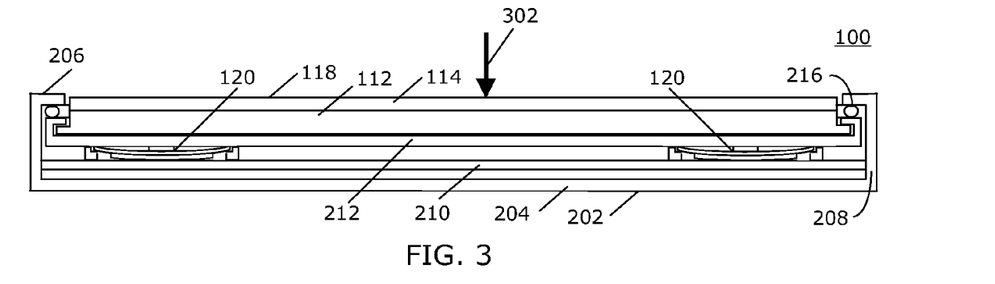
FIG. 3 is a sectional side view of a portable electronic device with a depressed touch-sensitive display in accordance with the disclosure.

The touch-sensitive display 118 is moveable and depressible with respect to the housing 202. A force 302 applied to the touch-sensitive display 118 moves, or depresses, the touch-sensitive display 118 toward the base 210. When sufficient force is applied, the actuator 120 is depressed or actuated as shown in FIG. 3. The touch-sensitive display 118 may also pivot within the housing to depress the actuator 120. The actuators 120 may be actuated by pressing anywhere on the touch-sensitive display 118. The processor 102 receives a signal when the actuator 120 is depressed or actuated.

Figure 4:
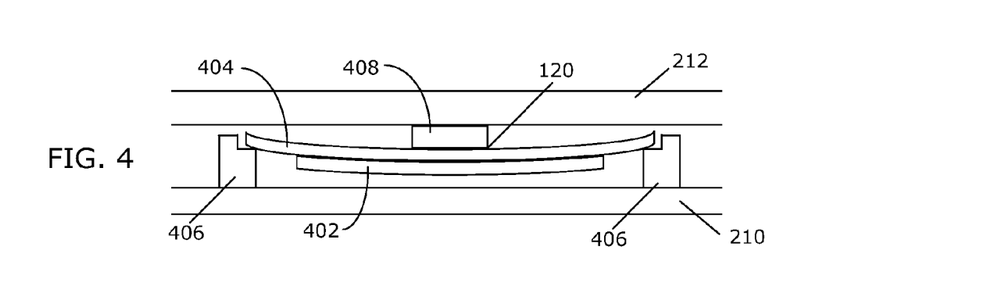
FIG. 4 is a sectional side view of a piezoelectric actuator in accordance with the disclosure.

A cross section taken through the center of a piezo actuator 120 is shown in FIG. 4. The actuator 120 may comprise one or more piezo devices or elements 402. The piezo actuator 120 is shown disposed between the base 210 and the touch-sensitive display 118. The piezo actuator 120 includes a piezoelectric element 402, such as a piezoelectric ceramic disk, fastened to a substrate 404, for example, by adhesive, lamination, laser welding, and/or by other suitable fastening method or device. The piezoelectric material may be lead zirconate titanate or any other suitable material. Although the piezo element 402 is a ceramic disk in this example, the piezoelectric material may have any suitable shape and geometrical features, for example a non-constant thickness, chosen to meet desired specifications.

The substrate 404, which may also be referred to as a shim, may be comprised of a metal, such as nickel, or any other suitable material such as, for example, stainless steel, brass, and so forth. The substrate 404 bends when the piezo element 402 contracts diametrically, as a result of build up of charge at the piezo element 402 or in response to a force, such as an external force applied to the touch-sensitive display 118.

The substrate 404 and piezo element 402 may be suspended or disposed on a support 406 such as a ring-shaped frame for supporting the piezo element 402 while permitting flexing of the piezo actuator 120 as shown in FIG. 4. The supports 406 may be disposed on the base 210 or may be part of or integrated with the base 210, which may be a printed circuit board. Optionally, the substrate 404 may rest on the base 210, and each actuator 120 may be disposed, suspended, or preloaded in an opening in the base 210. The actuator 120 is not fastened to the support 406 or the base 210 in these embodiments. The actuator 120 may optionally be fastened to the support 406 through any suitable method, such as adhesive or other bonding methods.

A pad 408 may be disposed between the piezo actuator 120 and the touch-sensitive display 118. The pad 408 in the present example is a compressible element that may provide at least minimal shock-absorbing or buffering protection and may comprise suitable material, such as a hard rubber, silicone, and/or polyester, and/or other materials. The pad 408 is advantageously flexible and resilient and may provide a bumper or cushion for the piezo actuator 120 as well as facilitate actuation of the piezo actuator 120 and/or one or more force sensors 122 that may be disposed between the piezo actuators 120 and the touch-sensitive display 118. When the touch-sensitive display 118 is depressed, the force sensor 122 generates a force signal that is received and interpreted by the microprocessor 102. The pad 408 may be advantageously aligned with an optional force sensor 122 to facilitate the transfer or focus of forces exerted on the touch-sensitive display 118 onto the force sensors 122. The pads 408 transfer forces between the touch-sensitive display 118 and the actuators 120 whether the force sensors 122 are above or below the pads 408. The pads 408 facilitate provision of tactile feedback from the actuators 120 to the touch-sensitive display 118 without substantially dampening the force applied to or on the touch-sensitive display 118.

Figure 5:
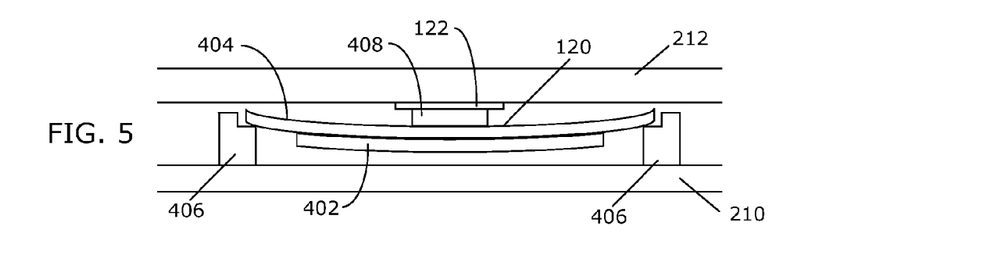
FIG. 5 is a sectional side view of a piezoelectric actuator with a force sensor in accordance with the disclosure.

The optional force sensor 122 may be disposed between the piezo actuator 120 and the touch-sensitive display 118 as shown in FIG. 5. The force sensor 122 may be disposed between the touch-sensitive display 118 and the pad 408 or between the pad and the piezo actuator 120, to name a few examples. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. A piezoelectric device, which may be the piezo element 402, may be utilized as a force sensor.

Force information related to a detected touch may be utilized to select information, such as information associated with a location of a touch. For example, a touch that does not meet a force threshold may highlight a selection option, whereas a touch that meets a force threshold may select or input that selection option. A value meets a threshold when the value is at or beyond the threshold. The input of the selection option is typically processed by the processor 102. The force threshold may be determined by a force sensor, by a force that actuates an actuator, or other force determination device. Selection options include, for example, displayed or virtual keys of a keyboard; selection boxes or windows, e.g., "cancel," "delete," or "unlock"; function buttons, such as play or stop on a music player; icons, representing applications or other features, and so forth. Different magnitudes of force may be associated with different functions or input. For example, a lesser force may result in panning, and a higher force may result in zooming.

Figure 6:
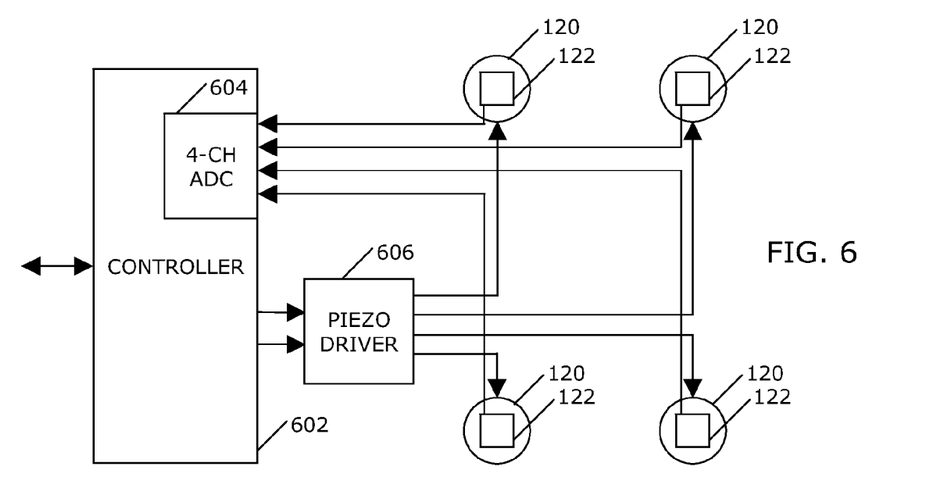
FIG. 6 is a block diagram including force sensors and actuators of the portable electronic device 100 in accordance with the disclosure.

A block diagram including force sensors and actuators of the portable electronic device 100 is shown in FIG. 6. In this example, each force sensor 122 is electrically connected to a controller 602, which includes an amplifier and analog-to-digital converter (ADC) 604. Each force sensor 122 may be, for example, a force-sensing resistor wherein the resistance changes as force applied to the force sensor 122 changes. As applied force on the touch-sensitive display 118 increases, the resistance decreases. This change is determined via the controller 116 for each of the force sensors 122, and a value representative of the force at each of the force sensors 122 may be determined.

The piezo actuators 120 are electrically connected to a piezo driver 604 that communicates with the controller 602. The controller 602 is also in communication with the main processor 102 of the portable electronic device 100 and may exchange signals with the main processor 102. The piezo actuators 120 and the force sensors 122 are operatively connected to the main processor 102 via the controller 602. The controller 602 controls the piezo driver 606 that controls the current/voltage to the piezoelectric devices 402 of the actuator 120, and thus the controller 602 controls the force applied by the piezo actuators 120 on the touch-sensitive display 118. The piezoelectric devices 402 may be controlled individually via a separate control line between each actuator 120 and the controller 602. Different signals may be sent to each different actuator 120. Alternatively, the piezoelectric devices 402 may be controlled substantially equally and concurrently, for example, by the same signal that may be provided through a common control line that extends to each actuator 120 or by individual control lines such as shown in FIG. 6.

The tactile feeling of switches, actuators, keys, other physical objects, textures, and so forth may be simulated, or a non-simulated tactile feedback may be provided by controlling the piezoelectric devices 402. For example, when a force applied on the touch-sensitive display 118 exceeds a depression threshold, the voltage/charge at the piezo actuators 120 is modified such that the piezo actuator 120 imparts a force on the touch-sensitive display 118, which force may, for example, simulate depression of a dome switch. When the force applied to the touch-sensitive display 118 falls below a release threshold, the voltage/charge at the piezo actuators 120 is modified such that the piezo actuator 120 imparts a force or discontinues imparting a force on the touch-sensitive display 118, which may, for example, simulate release of a dome switch.

The actuators 120 may vibrate the touch-sensitive display 118 in opposing directions, e.g., in the z direction or up and down from the perspective of any of FIG. 2 through FIG. 5. Alternatively, the actuators may vibrate the touch-sensitive display 118 by vibrating the touch-sensitive display 118 in directions other than perpendicular to the touch-sensitive display 118. The vibration may be varied by varying one or more parameters of the vibration, such as amplitude or magnitude, frequency, and duration. The touch-sensitive display 118 vibrates while the housing 202 remains relatively stationary, i.e., the housing 202 is not directly vibrated. Although the tactile feedback is provided to the touch-sensitive display 118, less intense feedback may be felt along the housing 202. The touch-sensitive display 118 may be vibrated at one or more frequencies. The touch-sensitive display 118 may be vibrated at multiple frequencies, for example, vibrating at one frequency for one time period followed by vibrating at another frequency for another period. The actuators 120 may be controlled to vibrate over various or varied distances. The actuators 120 may be controlled to vibrate the touch-sensitive display 118 across a varying frequency sweep, for example, from one frequency to another frequency and back to the original frequency. Vibrations may be provided at various frequencies and across various frequency ranges. Other tactile feedback, such as pulses, clicks, or pops, may be provided by the piezo actuators 120.

The processor 102 generates and provides an actuation signal to the actuators 120 to provide tactile feedback to the touch-sensitive display 118. The actuation signal may be generated and tactile feedback may be provided in response to detected input from the touch-sensitive display 118, in response to receiving a wireless communication, or to facilitate finding, touching, and selecting selection options. The actuation signal includes tactile feedback information, such as frequency, duration, and amplitude, magnitude, or intensity of feedback information for the actuators 120. The actuation signal may be based at least in part on the force or the force signal provided by the force sensors 122. The intensity of the feedback may be varied in relation to the amount of the applied force. The actuation signal provides information and/or instructions for how the actuators 120 provide tactile feedback, e.g., how the actuators 120 move the touch-sensitive display 118. The piezo actuators 120 move the touch-sensitive display relative to the housing 202 to provide the tactile feedback. For example, the piezo actuators 120 may move the touch-sensitive display 118 in opposing directions, e.g., in each z direction or up and down from the perspective of FIG. 3, resulting in vibration of the touch-sensitive display 118. The touch-sensitive display 118 may move in an inward direction with respect to the housing 202, i.e., in a direction toward the base 201 or back 204 of the housing 202. The touch-sensitive display 118 may also move in an outward direction with respect to the housing 202, i.e., in a direction away from the base 201 or back 204 of the housing 202. In another example, the provision of tactile feedback may result in a single movement of the touch-sensitive display 118, such as a single pulse or click. The tactile feedback may comprise different characteristics, for example, vibrations and pulses or clicks, individually or in combination, and may simulate various different perceptible tactile sensations among the characteristics.

The actuators 120 may be controlled to provide tactile feedback having different characteristics. The amplitude and/or frequency of the vibration may be selected to cause a particular sensation when a user touches the touch-sensitive display 118. For example, varying the amplitude and/or frequency of vibration may vary the resistance to movement of a touch along the touch-sensitive display. Thus, tactile feedback may have the characteristic of a low friction effect or a high friction effect. Such resistance is generally related to a coefficient of friction of a touch along the touch-sensitive display 118. For example, increasing the frequency of vibration reduces the resistance to movement of a touch along the touch-sensitive display 118, thus a touch more easily slides along the touch-sensitive display 118. Decreasing the frequency of vibration increases the resistance to movement of a touch along the touch-sensitive display 118, thus a touch slides with more difficulty along the touch-sensitive display 118. When the touch-sensitive display 118 is not vibrated, the resistance to movement along the touch-sensitive display 118 is highest. Varying the amplitude and/or duration of the vibration causes similar effects to resistance to movement along the touch-sensitive display 118. For example, reducing the amplitude and increasing the duration, i.e., time vibrated compared to time not vibrated, of the vibration reduces resistance to movement along the touch-sensitive display 118.

The frequency of vibration may be varied, for example, to vary the resistance to movement of a touch along the touch-sensitive display 118. For example, the vibration may be varied across a range of frequencies, e.g., 30 kHz to 80 kHz. Alternatively, the ends of the range of frequencies may vary. For example, the range of frequencies may be between 30 kHz to 35 kHz and 75 kHz to 80 kHz. Any frequency ranges may be utilized depending on the capabilities of the actuators 120 and the properties of the touch-sensitive display 118. The highest frequency of vibration typically results in the least resistance to movement along the touch-sensitive display 118. Similarly, the amplitude of vibration may be varied, for example, to vary the resistance to movement of a touch along the touch-sensitive display 118. Smaller amplitudes of vibration, e.g., 3 to 5 μm, result in less resistance to movement along the touch-sensitive display 118 than larger amplitudes of vibration, e.g., 100 to 150 μm.

To reduce or inhibit audible buzzing or humming due to vibration of the touch-sensitive display 118, the frequency of the vibration may be set to a frequency above the audible range of a user, e.g., above 20 kHz. Setting the vibration to a frequency at or near the resonant frequency of the touch-sensitive display 118, for example 30 kHz, results in more efficient vibration, resulting in more efficient battery usage for the portable electronic device 100. Different touch-sensitive displays 118 and different portable electronic devices may have different resonant frequencies. Resonant frequency determination may take into account engagement of a contact member, e.g., a finger or stylus. Other frequencies may be utilized.

Figure 7:
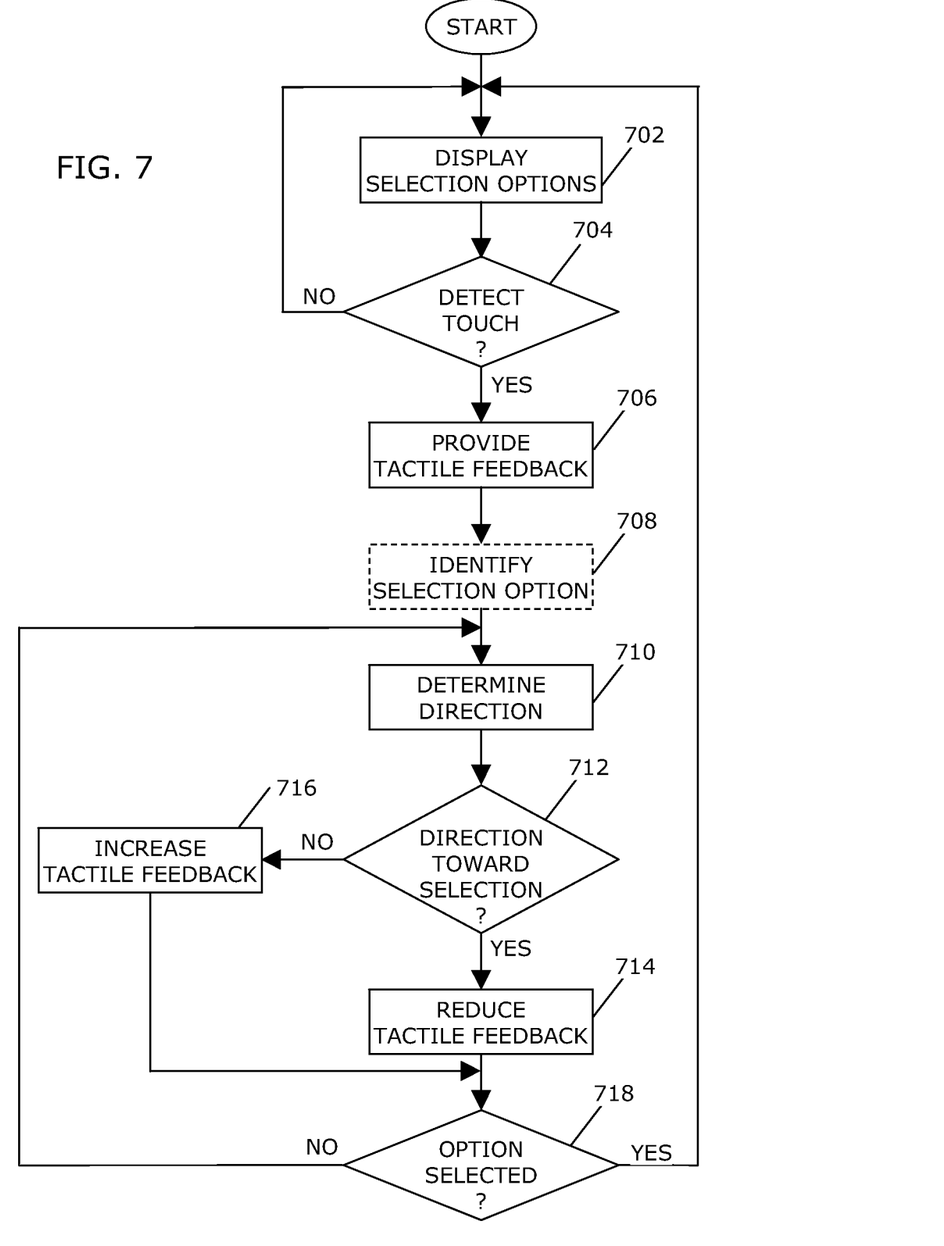
FIG. 7 is a flowchart illustrating a method of providing tactile feedback in accordance with the disclosure.

A flowchart illustrating a method of providing tactile feedback for a touch-sensitive display of a portable electronic device is shown in FIG. 7. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium.

One or more selection options are displayed 702. When a touch is detected 704, tactile feedback is provided 706. A touch may comprise a single continuous touch or a plurality of individual touches. Tactile feedback may generally be provided by an actuation signal provided to the actuators 120. The processor 102 may generate the actuation signal based on stored information, calculations, formulas, processes performed on a map, such as a map of resistance to movement along the touch-sensitive display, and so forth. Optionally, one of the selection options may be identified 708. For example, a predictive text algorithm, as known in the art, may be utilized to identify a selection item, such as one of a plurality of characters displayed, for example, on a virtual keyboard. Alternatively, when a few selection options are displayed, a selection option may be identified by identifying the selection option most likely to be chosen, for example, by identifying the selection option most often selected, least likely to lose data, least likely to cause undesired input or performance of functions, and so forth. The actuation signal may be generated to facilitate finding, identifying, qualifying, and/or selection of selection options. The actuation signal may be generated, for example, to direct a user to the identified selection option, for example, by varying the tactile feedback such that the resistance to movement of a touch along the touch-sensitive display increases or decreases depending on the touch location and whether the touch is moving toward the identified selection option.

A direction of the touch is determined 710. A current touch location and one or more recent touch locations may be utilized to determine the direction. When the direction is toward the identified selection at 712, tactile feedback is reduced 714. Tactile feedback may be reduced, for example, by reducing the resistance to movement of a touch along the touch-sensitive display. Alternatively, tactile feedback may be reduced by reducing resistance to movement of a trackball, reducing resistance to movement along a trackpad or optical joystick, or reducing vibration felt through the housing of the portable electronic device 100. For example, the frequency of vibration may be increased or the amplitude of vibration decreased to reduce the resistance to movement of a touch along the touch-sensitive display. When the direction is not toward the identified selection at 712, tactile feedback is increased 716. A direction toward the identified selection may be a direction from a current point that intersects via a straight line any point in the area of a selection option or its active area. An active area is the area associated with a selection option, such that a touch detected at a location within the associated active area results in highlighting or selecting that selection option. Although an active area is typically the same as the displayed area of a selection box for a selection option, the active area may be larger or smaller than the displayed area of the selection box. A slightly larger area than the active area may also be included. Any other direction is a direction is not toward the identified selection. Tactile feedback may be increased, for example, by increasing the resistance to movement of a touch along the touch-sensitive display. Alternatively, tactile feedback may be increased by increasing resistance to movement of a trackball, increasing resistance to movement along a trackpad or optical joystick, or increasing vibration felt through the housing of the portable electronic device 100. For example, the frequency of vibration may be decreased or the amplitude of vibration increased to reduce the resistance to movement of a touch along the touch-sensitive display. When a selection option is chosen, the process continues at 702, otherwise the process continues at 710.

Figure 8:
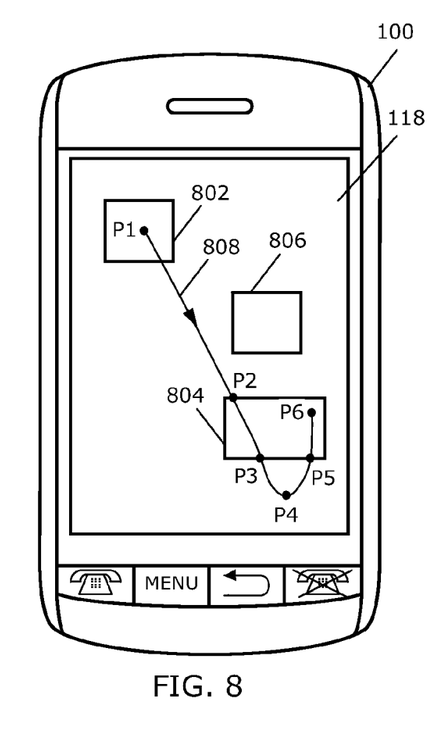
FIG. 8 is a front view of a portable electronic device with selection options displayed on the touch-sensitive display in accordance with the disclosure.

A front view of a portable electronic device shown with selection options displayed on the touch-sensitive display is shown in FIG. 8. Three selection options 802, 804, 806 are displayed, and the lowest displayed option 804 is the selection option identified, for example, and the most likely option to be selected. The path 808 of a touch starts at P1 and continues to P6, where the selection option 804 is selected.

Figure 9:
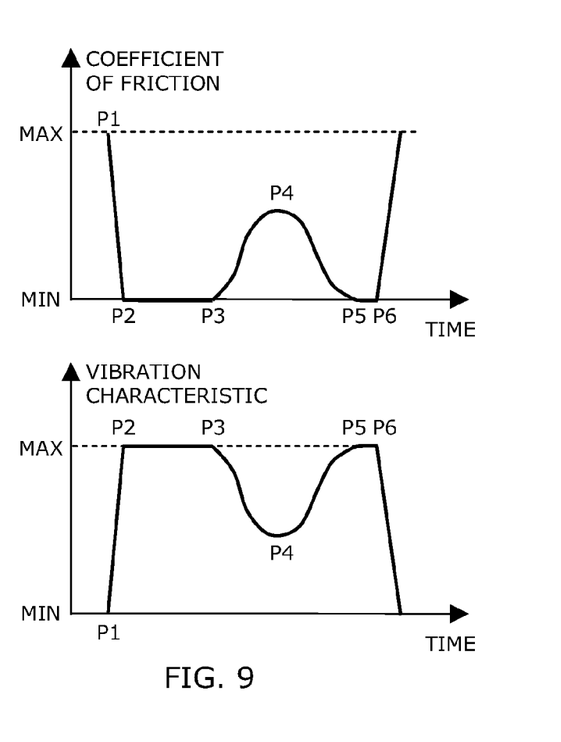
FIG. 9 shows graphs of characteristics of tactile feedback in accordance with the disclosure.

Graphs of characteristics of tactile feedback are shown in FIG. 9. The upper graph illustrates an example of coefficient of friction or resistance to movement by a touch along the touch-sensitive display 118 effectively provided by tactile feedback. The lower graph illustrates an example of a vibration characteristic, such as amplitude, frequency, or duration, that comprises the tactile feedback. The example graphs are correlated to the points P1 through P6 along the touch path 808 of FIG. 8.

The touch event begins at P1, where the coefficient of friction or resistance to movement by a touch along the touch-sensitive display 118 is maximized. Frequency of vibration is the characteristic of tactile feedback that is varied in this example in the lower graph between a minimum and a maximum frequency for a chosen range, such as 30 kHz and 80 kHz. At P1, the frequency is 30 kHz in the example. As the touch proceeds toward P2 in the direction of the identified selection option 804, the friction coefficient reduces linearly until its minimum value at P2, which is at the edge of the active area for the selection option 804, which in this example is the same as the display area of the selection box for the selection option 804. The frequency of the vibration of the tactile feedback increases linearly from P1 to P2, where the frequency is at its maximum value in this example, and the resistance to movement along the touch-sensitive display 118 reduces linearly as the touch approaches the identified selection option 804. As the touch moves from P2 to P3, which movement is within the active area of the selection option 804, the friction coefficient remains at its minimum value, while the frequency of the vibration of the tactile feedback remains at the maximum frequency value, 80 kHz in this example. As the touch continues from P3 to P4 along a curved path away from the identified selection option 804, which is in a direction not toward the identified selection option 804, the friction coefficient increases, and the frequency value of the tactile feedback decreases, both in a curved manner, thereby increasing the resistance to movement along the touch-sensitive display 118. As the touch continues from P4 to P5 along a curved path toward the identified selection option 804, the friction coefficient decreases, and the frequency value of the tactile feedback increases, both in a curved manner, thereby decreasing the resistance to movement along the touch-sensitive display 118. As the touch moves from P5 to P6, which movement is within the active area of the selection option 804, the friction coefficient remains at its minimum value, while the frequency of the vibration of the tactile feedback remains at the maximum frequency value for the range, 80 kHz in this example. At P6, the identified selection option is selected, and the tactile feedback returns to the starting points, e.g., maximum friction coefficient and minimum frequency. The minimum frequency for a chosen range may be 0 Hz, or no tactile feedback, to reduce energy draw on the battery. Although the above example utilizes the minimum and maximum for an operating range of different characteristics, different values for those ranges may be utilized. Operation of the device 100 need not strictly be maintained between a minimum and maximum for a range, e.g., operation may not reach the minimum or maximum of the range.

Figure 10:
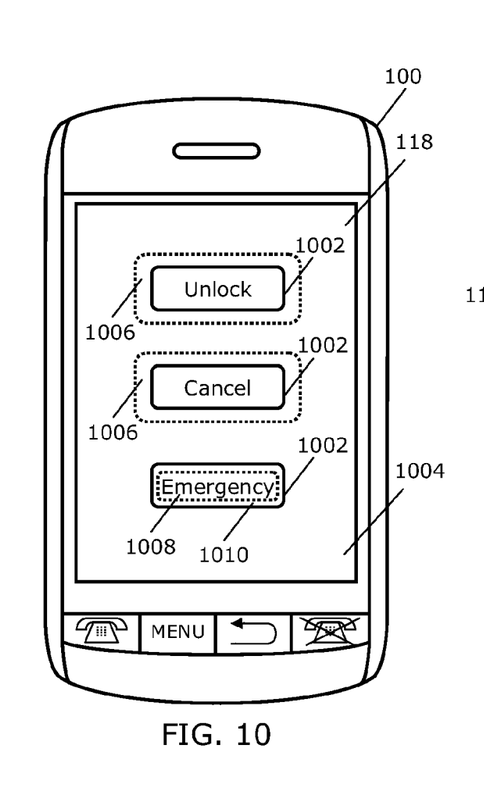
FIG. 10 is a front view of a portable electronic device with selection options displayed on the touch-sensitive display in accordance with the disclosure.

Each application, including the homescreen, may have one or more maps of touch locations and tactile feedback characteristics. For example, each different set of selection options for any application may have a map of tactile feedback characteristics for each location on the touch-sensitive display 118, for example, resistance to movement along the touch-sensitive display 118. For example, the selection options "Unlock," "Cancel," and "Emergency" are displayed on the password entry screen shown in FIG. 10. The options are displayed in selection boxes 1002 with the word associated with the option displayed inside each box. The areas 1004 not associated with the selection boxes may be assigned very high resistance values because no function is associated with these areas. The "Unlock" and "Cancel" selection boxes may be assigned very low resistance values, because these options are the most likely to be selected. Optionally, the areas 1006 adjacent to these selection boxes may have a slightly higher resistance value than the selection box but lower than the surrounding areas 1004 to facilitate selection. The "Emergency" selection box may have a middle resistance value, because inadvertent selection of such an option is undesirable. Optionally, the innermost area 1008 of the "Emergency" selection box may have a lower resistance value than the area 1010 inside the selection box 1002 nearest the border. Alternatively, a variable resistance may be applied to one or more selection options. For example, resistance to movement of touch may vary based on the distance of the touch from the selection item. For example, resistance may be higher further from the selection option and lower closer to the selection option. For example, the frequency of vibration may vary linearly or exponentially with respect to the inverse of the distance to the selection option. Beyond a predetermined distance, such as 1 cm, the width of an average finger, and so forth, the tactile feedback may be maximized or eliminated. In addition, tactile feedback within a selection box for a selection option may vary within the selection box, e.g., linearly, with the least resistance to movement near the center of the box and the most resistance to movement near the border of the box.

The tactile feedback, e.g., characteristic of vibration, may be varied based on a number of criteria, for example, touch location, displayed information, proximity to a selection option, application settings, user profiles, manual adjustments, predictive text algorithms, function performed, user history, touch force, user touch techniques, and so forth.

Figure 11:
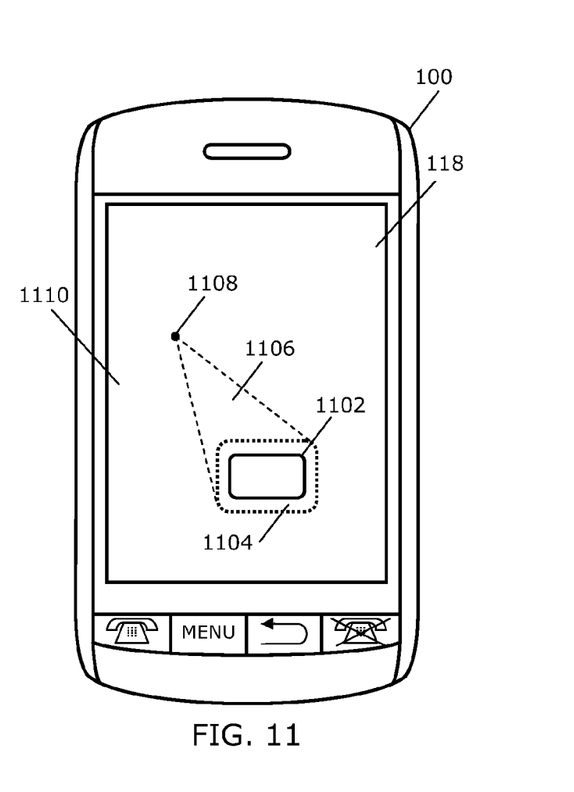
FIG. 11 is a front view of a portable electronic device with a selection option displayed on the touch-sensitive display and associated areas illustrated in accordance with the disclosure.

For example, tactile feedback may have one characteristic, e.g., low resistance to movement of a touch along the touch-sensitive display, when the touch location is associated with an identified selection option. Tactile feedback may have another characteristic, e.g., high resistance to movement of a touch along the touch-sensitive display, when the touch location is not associated with the identified selection option, for example. Areas associated with a selection option may comprise the active area or selection box 1102 for a selection option and, optionally, any adjacent areas 1104, such as shown in FIG. 11. Touches associated with selection options include touches at locations that are associated with the areas associated with the selection options. The area 1106 comprising a path between a touch location 1108 and the identified selection option 1102 may also be considered to be associated with the identified selection option. The area 1106 comprising a path between a touch location 1108 and the identified selection option 1102 varies as the touch moves. Areas or touch locations that are not associated with the identified selection option, e.g., the areas outside the path area 1106 and the adjacent area 1104, are considered not to be associated with the identified selection option.

Alternatively, varying resistance to movement may also be advantageous to highlight aspects of information displayed on a touch-sensitive display, for example, to emphasize selection options, de-emphasize selection options, and/or to highlight displayed information. For example, a calendar application may display a calendar with discrete areas associated with dates and times. Tactile feedback may be provided with lower resistance to movement along the touch-sensitive display 118 for touches at areas associated with available times for a meeting and with higher resistance to movement along the touch-sensitive display 118 for touches at areas associated with unavailable times for a meeting. Alternatively, tactile feedback may be provided with higher resistance to movement along the touch-sensitive display 118 for areas associated with available times for a meeting and with lower resistance to movement along the touch-sensitive display 118 for areas associated with unavailable times for a meeting. As the touch location crosses a boundary of the calendar, such as a date or time period, tactile feedback, such as a pulse, may be provided to more positively indicate location of the touch within a discrete area of the calendar. Other applications divided into multiple discrete areas, such as spreadsheets or games, may also provide variable tactile feedback based on touch location to change the resistance to movement of a touch along the touch-sensitive display 118. Optionally, different tactile feedback may be provided as a finger crosses a boundary of the selection box of a selection option, such as a pulse or a quick vibration at a different frequency than the vibration prior to crossing the boundary. Alternatively, the actuators 120 may raise the touch-sensitive display while the touch location is associated with the identified selection option. For example, the touch-sensitive display 118 may be raised approximately 100 μm.

Specific applications may take advantage of the ability to provide varying tactile feedback. For example, a physical therapy program may utilize varying tactile feedback to rehabilitate a finger, hand, wrist, and so forth, e.g., to build fine motor skills after an injury. Varying tactile feedback may be applied to assist a visually-impaired person to make selections on a touch-sensitive display 118, for example, in addition to any screen reading program that may run on the portable electronic device 100.

The characteristics of the tactile feedback may be stored in application settings or user profiles. Manual adjustment capability may be provided, and the manual adjustments stored for an application and/or in user profiles. For example, the portable electronic device may store amplitude, frequency range, and/or duration of frequency of vibration selected or entered by a user.

Predictive text algorithms may be utilized to identify one or more selection options for which tactile feedback may be varied. For example, when "gree" has been entered, "d," "n," and "t" are the most likely characters to be entered, i.e., the identified selection options described above. Tactile feedback along the paths between the displayed "e" key, or other touch location, and the displayed keys for "d," "n," and "t" may be provided to reduce resistance to movement of a touch along these paths to facilitate entry of these characters. Although tactile feedback may facilitate movement of a touch along the touch-sensitive display toward the identified selection option(s), such tactile feedback does not prohibit entry of other characters.

Predictive text algorithms may be utilized in conjunction with other criteria, such as a user touch technique, e.g., thumb-typing. When a predictive text algorithm identifies a vowel as the most likely character to be entered, the paths to the vowels may extend from one side of the touch-sensitive display 118 or the other depending on the vowel. For example, "a" and "e" may be presumed to be typed by a left thumb, and areas of reduced resistance for these selection options may extend to the left of the selection boxes. The letters "u" and "i" and "o" may be presumed to be typed by a right thumb, and areas of reduced resistance for these selection options may extend to the right of the selection boxes. The areas of reduced resistance may also extend below or above the displayed character or function to accommodate easier thumb-typing.

User history may be utilized to provide or vary tactile feedback. For example, when a user routinely deletes an "L" after entering a "K," which may indicate inadvertent sliding toward the "L," tactile feedback may be applied to increase resistance to movement along the touch-sensitive display 118 between "K" and "L" after the "K" is entered.

The tactile feedback may be adjusted to accommodate for touch rate and force of touch. For example, the frequency of vibration may be increased to reduce the resistance to movement along the touch-sensitive display 118 to facilitate ease of operation when higher touch rates and/or more forceful or heavy touches are utilized.

A user may type on a virtual keyboard with a contact member, such as a stylus or one or more fingers, that drags or slides along the touch-sensitive display 118. In this situation, tactile feedback may be provided such that the resistance to movement along the touch-sensitive display 118 is reduced, e.g., by increasing the frequency of vibration, thereby facilitating easier sliding of the contact member along the touch-sensitive display 118. The tactile feedback, such as a vibration, may be provided at a higher frequency when one or more touch locations are associated with the area of the virtual keys, whereas tactile feedback may be provided at a lower frequency, or not at all, when one or more touch locations are associated with an area other than the virtual keys. Drawing applications, games, and other applications may also have one or more areas on the touch-sensitive display 118 for which reduced resistance to movement is beneficial.

Optionally, other processes may be utilized in addition to varying tactile feedback to facilitate easier selection of selection options, such as increasing the active area of the identified selection option(s) and/or reducing the force threshold for the selection option(s).

Although the above description utilizes the example of a touch-sensitive display, the method and embodiments may be applied to other touch-sensitive devices that do not include a display, such as a trackball, trackpad, touchpad, optical trackpad or touchpad, and so forth. The method applies to a cursor rather than a touch for such devices. Tactile feedback may be applied to the touch-sensitive device as well as to the display and/or housing of the portable electronic device. The method may be applied to moveable or non-moveable (e.g., fixed with respect to a housing) touch-sensitive displays, touch-sensitive devices with or without tactile feedback, and touch-sensitive devices with or without force sensors.

A method of providing tactile feedback includes providing tactile feedback when a touch or cursor is associated and is not associated with a selection option. Thus, a touch or cursor may be directed to a selection option by varying tactile feedback in accordance with a path between a touch location and a selection option. The tactile feedback facilitates finding, locating, and selecting selection options, facilitating use by visually impaired persons and/or facilitating use without looking at the touch-sensitive display. Tactile feedback facilitating finding, locating, and selecting selection options decreases device use time, reduce selection errors and may reduce power consumption.

A method comprises displaying on a display at least one selection option comprising a first selection option and detecting a touch or cursor on the display. Tactile feedback having a first characteristic is provided when the touch or cursor is at a first location associated with the first selection option. Tactile feedback having a second characteristic is provided when the touch or cursor is detected at a second location not associated with the first selection option.

A method comprises displaying, on a touch-sensitive display, at least one selection option comprising a first selection option, detecting a touch moving along the touch-sensitive display, and determining a direction of the touch. Tactile feedback having a first characteristic is provided when the direction is toward the first selection option. Tactile feedback having a second characteristic is provided when the direction is other than toward the first selection option.

A portable electronic device comprises a touch-sensitive device and a tactile feedback apparatus operably coupled to the touch-sensitive device. A processor operably coupled to the touch-sensitive device and the tactile feedback apparatus is configured to display a selection option on a display, engage the tactile feedback apparatus to provide tactile feedback having a first characteristic when a touch or cursor is at a first location associated with the selection option, engage the tactile feedback apparatus to provide tactile feedback having a first characteristic when a touch or cursor is at a first location associated with the selection option, and engage the tactile feedback apparatus to provide tactile feedback having a second characteristic when the touch or cursor is detected at a second location not associated with the selection option. The tactile feedback apparatus may comprise at least one piezoelectric device or other device capable of providing variable feedback to a touch-sensitive display.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   displaying a plurality of selection options comprising a plurality of characters on a display;
   identifying, with a predictive text algorithm, a predicted selection option of the plurality of characters;
   detecting a touch or cursor on the display;
   providing tactile feedback having a first friction characteristic when the touch or cursor is at a first location associated with a path toward the predicted selection option;
   providing tactile feedback having a second friction characteristic when the touch or cursor is detected at a second location not associated with a path toward the predicted selection option.

2. The method of claim 1, further comprising:
   determining a direction of the touch or cursor;
   when the direction is toward the first selection option, providing tactile feedback having a third characteristic;
   when the direction is other than toward the first selection option, providing tactile feedback having a fourth characteristic.

3. The method of claim 2, wherein the third characteristic comprises vibration providing a low resistance to movement and the fourth characteristic comprises vibration providing a high resistance to movement.

4. The method of claim 1, wherein the first friction characteristic comprises vibration having a first friction effect and the second friction characteristic comprises vibration having a second friction effect higher than the first friction effect.

5. The method of claim 1, wherein the first location is associated with the first selection option when the first location is associated with an active area of the first selection option and an area adjacent to the active area.

6. A computer-readable storage device having computer-readable code executable by at least one processor of the portable electronic device to perform the method of claim 1.

7. A method comprising:
   displaying a plurality of selection options comprising a plurality of characters, the plurality of selection options including a first selection option on a touch-sensitive display;
   identifying, with a predictive text algorithm, the first selection option from the plurality of characters
   detecting a touch moving along the touch-sensitive display;
   determining a direction of the touch;
   providing tactile feedback having a first characteristic when the direction is toward the first selection option;
   providing tactile feedback having a second characteristic when the direction is other than toward the first selection option.

8. The method of claim 7, wherein the first characteristic comprises vibration at a first frequency, amplitude, and duration and the second characteristic comprises vibration at a second frequency, amplitude, and duration.

9. A computer-readable storage device having computer-readable code executable by at least one processor of the portable electronic device to perform the method of claim 7.

10. The method of claim 7, wherein the first characteristic comprises vibration having a first friction effect and the second characteristic comprises vibration having a second friction effect higher than the first friction effect.

11. A portable electronic device comprising:
    a touch-sensitive device;
    a tactile feedback apparatus operably coupled to the touch-sensitive device;
    a processor operably coupled to the touch-sensitive device and the tactile feedback apparatus and configured to:
      display a plurality of selection options comprising a plurality of characters on a display;
      identify, with a predictive text algorithm, a predicted selection option of the plurality of characters;
      engage the tactile feedback apparatus to provide tactile feedback having a first friction characteristic when a touch or cursor is at a first location associated with a path toward the predicted selection option;
      engage the tactile feedback apparatus to provide tactile feedback having a second friction characteristic when the touch or cursor is detected at a second location not associated with a path toward the predicted selection option.

12. The portable electronic device of claim 11, wherein the processor is further configured to:
   determine a direction of the touch or cursor;
   when the direction is toward the selection option, engage the tactile feedback apparatus to provide tactile feedback having a third characteristic;
   when the direction is other than toward the selection option, engage the tactile feedback apparatus to providing tactile feedback having a fourth characteristic.

13. The portable electronic device of claim 11, wherein the first friction characteristic comprises vibration having a first friction effect and the second friction characteristic comprises vibration having a second friction effect higher than the first friction effect.

14. The portable electronic device of claim 11, wherein the tactile feedback apparatus comprises at least one piezoelectric device.

15. The portable electronic device of claim 11, wherein the touch-sensitive device is a touch-sensitive display.

16. A portable electronic device comprising:
   a touch-sensitive display;
   a tactile feedback apparatus operably coupled to the touch-sensitive display;
   a processor operably coupled to the touch-sensitive display and the tactile feedback apparatus and configured to:
      display a plurality of selection options comprising a plurality of characters, the plurality of selection options including a first selection option on a touch-sensitive display;
      identify, with a predictive text algorithm, the first selection option from the plurality of characters;
      determine a direction of a touch moving along the touch-sensitive display;
      when the direction is toward the selection option, send a first signal to the tactile feedback apparatus to provide tactile feedback having a first characteristic;
      when the direction is other than toward the selection option, send a second signal to the tactile feedback apparatus to provide tactile feedback having a second characteristic.

17. The portable electronic device of claim 16, wherein the first characteristic comprises vibration at a first frequency and the second characteristic comprises vibration at a second frequency.

18. The portable electronic device of claim 16, wherein the tactile feedback apparatus comprises at least one piezoelectric device.

19. The portable electronic device of claim 16, wherein the first characteristic comprises vibration having a first friction effect and the second characteristic comprises vibration having a second friction effect higher than the first friction effect.

* * * * *